United States Patent
Baltsen (10) Patent No.: US 10,152,645 B2
(45) Date of Patent: Dec. 11, 2018

(54) METHOD AND APPARATUS FOR UPDATING A BACKGROUND MODEL USED FOR BACKGROUND SUBTRACTION OF AN IMAGE

(71) Applicant: Axis AB, Lund (SE)

(72) Inventor: Joakim Baltsen, Lund (SE)

(73) Assignee: Axis AB, Lund (SE)

( * ) Notice: Subject to any disclaimer, the term of this patent is extended or adjusted under 35 U.S.C. 154(b) by 3 days.

(21) Appl. No.: 15/587,752

(22) Filed: May 5, 2017

(65) Prior Publication Data

US 2017/0330050 A1 Nov. 16, 2017

(30) Foreign Application Priority Data

May 16, 2016 (EP) .................................... 16169786

(51) Int. Cl.
*G06K 9/34* (2006.01)
*G06F 17/30* (2006.01)
(Continued)

(52) U.S. Cl.
CPC ......... *G06K 9/342* (2013.01); *G06F 17/3028* (2013.01); *G06K 9/00718* (2013.01); *G06T 7/254* (2017.01); *G06T 2207/10016* (2013.01)

(58) Field of Classification Search
CPC .... G06K 9/342; G06K 9/00718; G06T 7/254; G06T 2207/10016; G06F 17/3028
See application file for complete search history.

(56) References Cited

U.S. PATENT DOCUMENTS 6,870,945 B2 * 3/2005 Schoepflin .............. G06T 7/254
348/169
8,009,918 B2 8/2011 Van Droogenbroeck et al.
(Continued)

FOREIGN PATENT DOCUMENTS

CN 102025981 A 4/2011
CN 105279771 A 1/2016
(Continued)

OTHER PUBLICATIONS

Extended European Search Report dated Dec. 8, 2016 in European application 16169786.7 filed on May 16, 2016 with Written Opinion.

(Continued)

*Primary Examiner* — Qian Yang
(74) *Attorney, Agent, or Firm* — Oblon, McClelland, Maier & Neustadt, L.L.P.

(57) ABSTRACT

There is provided a method and an apparatus for updating a background model used for background subtraction of an image. The method comprises: receiving an image (220), and classifying a region (226) in the image as foreground by performing background subtraction using a background model (240). The background model comprises a collection of background samples (248, 248*b*, 248*c*, 248*d*) for each pixel (228) in the image. The collection of background samples is arranged in a list of background images (242*a*, 242*b*, 242*c*, 242*d*). The method further comprises: replacing image contents in the region (226) of the image which is classified as foreground by image contents of a corresponding region (246) in a background image in the list, and adding the image to the list of background images by rearranging a collection of pointers (244*a*, 244*b*, 244*c*, 244*d*) which each points to one of the background images in (Continued)

the list, such that one of the pointers instead points to the image.

15 Claims, 6 Drawing Sheets

(51) Int. Cl.
*G06K 9/00* (2006.01)
*G06T 7/254* (2017.01)

(56) References Cited

U.S. PATENT DOCUMENTS

| | | | |
|---|---|---|---|
| 9,247,155 B2 | 1/2016 | Gupta et al. | |
| 2003/0044045 A1* | 3/2003 | Schoepflin | G06T 7/12 382/103 |
| 2003/0058237 A1* | 3/2003 | Lee | G06K 9/38 345/418 |
| 2004/0017930 A1 | 1/2004 | Kim et al. | |
| 2010/0158379 A1 | 6/2010 | Hatfield et al. | |
| 2010/0208998 A1* | 8/2010 | Van Droogenbroeck | G06K 9/38 382/195 |
| 2014/0056473 A1 | 2/2014 | Tojo | |

FOREIGN PATENT DOCUMENTS

| | | | |
|---|---|---|---|
| JP | 2002-109546 | | 4/2002 |
| JP | 2008-192131 | | 8/2008 |
| JP | 2008-257693 | | 10/2008 |
| JP | 2009-265827 | | 11/2009 |
| JP | 2012-048477 | | 3/2012 |
| KR | 10-2004-0008791 A | | 1/2004 |
| KR | 10-2014-0130638 A | | 11/2014 |
| WO | WO 2008008045 | * | 1/2008 |

OTHER PUBLICATIONS

Hanzi Wang et al. "A consensus-based method for tracking: Modelling background scenario and foreground appearance," Science Direct, Pattern Recognition 40, 2007, pp. 15.
Martin Hofmann et al. "Background Segmentation with Feedback: The Pixel-Based Adaptive Segmenter," Computer Vision and Pattern Recognition Workshop (CVPRW), 2012 IEEE Computer Society Conference on, IEEE, Jun. 2012, pp. 6.
Thierry Bouwmans et al. Traditional and recent approaches in background modeling for foreground detection: An overview, Computer Science Review 11-12, 2014, pp. 36.
Hanzi Wang et al. "SACON: A Consensus Based Model for Background Subtraction," Department of Electrical and Computer Systems Engineering, Technical Report MECSE-15-2005, 2005, pp. 9.
Chinese Office Action dated Jul. 4, 2018 in Chinese Application No. 201710329884.9, 5 pages.
Japanese Office Action dated Sep. 4, 2018 in Japanese Application No. 2017-094328, 4 pages.

* cited by examiner

METHOD AND APPARATUS FOR UPDATING A BACKGROUND MODEL USED FOR BACKGROUND SUBTRACTION OF AN IMAGE

TECHNICAL FIELD

The present invention relates to the field of background subtraction in images. In particular, it relates to updating of a background model used for background subtraction of an image.

BACKGROUND

In video surveillance, it is important to be able to detect moving objects in a scene as captured in a video sequence. There are many tools for motion detection in videos. Some of them track objects frame by frame by following features in the video stream. Others compare a current frame with a static background frame, pixel by pixel. The latter is the basis of background subtraction which aims at extracting moving objects by detecting zones where significant change occurs. Moving objects are referred to as foreground while static objects are part of the background.

The separation of moving objects from the background is a complex problem, which becomes even more difficult if the background is dynamic, such as if there are swaying trees or water ripples in the background, or if the illumination varies. In particular, a dynamic background may result in that the number of false detections of moving objects increases.

A review of background subtraction methods is given in the text book "Background Modeling and Foreground Detection for Video Surveillance" (Editors: Thierry Bouwmans, Fatih Porikli, Benjamin Höferlin, and Antoine Vacavant), CRC Press, Taylor & Francis Group, Boca Raton, 2015. See for example chapters 1 and 7.

Background subtraction methods generally involve a comparison of a current frame of a video stream with a reference background frame or model, free of moving objects. By comparing an image to the background frame or model, a decision may be taken whether or not each pixel in the image belongs to the foreground or the background. In this way, the image may be divided into two complementary sets of pixels—the foreground and the background.

Background subtraction requires definition of an underlying background model and an update strategy to accommodate for background changes over time. Plenty of background models have been proposed in the literature. This includes parametric models and non-parametric models.

An example of a parametric model is to model the background at a pixel location in the image by a Gaussian distribution. This may work well for a static scene, but will fail if the background pixels are multi-modal distributed, e.g., if there are waving trees in the background.

In order to deal with multi-modal distributed backgrounds it has been proposed to model the background at a pixel location in the image by a mixture of Gaussian distributions. Although such models are effective in modelling multi-modal distributed backgrounds, they have other drawbacks. For example, the estimation of the parameters may be difficult in a real-world noisy environment and it has been questioned whether natural images exhibit a Gaussian behaviour.

Due to these drawbacks, non-parametric models have been considered in the literature. For example, non-parametric kernel density estimates of the probability density function of past pixel values have been proposed. A strength of these models is that they may quickly adapt to high-frequency events in the background. A drawback is that they may have difficulty in handling events in the background evolving at different speeds.

Another type of non-parametric model is referred to as sample-based models. In such models, the background in each pixel is modelled by means of a collection of past background samples. In order to accommodate for background changes over time, the collection of past background samples is updated as a pixel in a current frame has been classified as belonging to the background. Wang and Suter ("A consensus-based method for tracking: Modelling background scenario and foreground appearance". *Pattern Recognition*, 40(3), 2007) propose to update the collection of past background samples according to a first-in-first-out principle. This means that the collection of past background samples is updated such that the oldest background sample is removed from the collection and the pixel value of the current frame is added to the collection. In U.S. Pat. No. 8,009,918 B2 an alternative updating approach is described in which the pixel value of the current frame replaces a randomly selected background sample in the collection of background samples.

A drawback of these background updating methods is that they require moving the actual background samples in the memory. For example, when updating an ordered collection of N background samples according to the first-in-first-out-principle, samples 1 to (N−1) of the collection needs to be moved to positions 2 to N of the collection before writing a new background sample to position 1 of the collection. This needs to be repeated for all pixel positions which have been classified as belonging to the background. There is therefore a need for improving the time complexity for updating sample-based background models.

SUMMARY OF THE INVENTION

In view of the above, it is thus an object of the present invention to improve the time complexity when updating a sample-based background model.

According to a first aspect of the invention, the above object is achieved by a method, performed in an apparatus, for updating a background model used for background subtraction of an image, comprising:

receiving an image, classifying a region of the image as foreground by performing background subtraction using a background model which comprises a collection of background samples for each pixel in the image, wherein the collection of background samples is arranged in a list of background images such that each pixel of the image has a background sample in a each of the background images at a pixel position which corresponds to that in the image, replacing image contents in the region of the image which is classified as foreground by image contents of a corresponding region in a background image in the list, and adding the image to the list of background images by rearranging a collection of pointers which each points to one of the background images in the list, such that one of the pointers instead points to the image.

The proposed method is thus a method of updating a sample-based background model. As a new image is received at time t, the background model built at time t−1 is used to classify the pixels in the new image as background or foreground. Thereafter, the background model is updated with background samples of the new image.

The background model is arranged as a list of background images. The background images comprise background samples of images preceding the new image in a sequence of images. The background samples in a background image do not necessarily originate from the same image in the sequence of images. The list of background images is further associated with a collection of pointers, wherein each pointer points to one of the background images in the list.

The present invention stems from the realization that the computational complexity may be reduced if the updating of the background model, i.e., the list of background images, is made by rearranging pointers to the background images instead of moving the background samples in memory as described above. In particular, by rearranging pointers such that one of the pointers points to the new image, all background samples of the new image may be added to the background model in one operation. In other words, the updating does not need to be performed pixel by pixel, and background samples do not need to be moved in the memory.

When the pointers are rearranged, all samples of the new image are added to the background model. In order to assure a conservative update, i.e., that only samples which have been classified as not being foreground are added to the background model, the method further propose to replace image contents, i.e., intensity values (possibly for several colour channels), in pixels which have been classified as foreground. More specifically, at those pixel positions in the new image where it is determined that a foreground object is present, image contents is instead copied from one of the background images in the list. This keeps the computational complexity low also when a conservative update is wanted.

By a background model is generally meant a model which represents the background in an image at a pixel level.

By background subtraction is generally meant a comparison of an image with a background model. By comparing an image to the background model, a decision may be taken whether or not each pixel in the image belongs to the foreground or the background.

By a background sample is generally meant a sample of an image, i.e., an observation or an intensity value (possibly in several color channels), in a pixel which has been classified as belonging to the background.

By a background image is generally meant a collection of background samples being arranged in a two-dimensional data structure. The size of the background image is the same as that of the received image. Thus, each pixel in a background image corresponds to a pixel in the received image. The background images comprise background samples of images preceding the image in a sequence of images. However, the background samples in a background image do not necessarily originate from the same image in the sequence of images.

By a list of background images is generally meant an ordered collection of background images.

By a pointer is generally meant a programming language object, whose value refers to, i.e., points to, another value stored elsewhere in the computer memory using its address. A pointer thus references a location in memory.

The background model may be updated according to a first-in-first-out principle. In this way, there is a temporal order of the background images in the list—the newest background samples are typically first in the list, and the oldest background samples may be found last in the list. In more detail, image contents in the region of the image which is classified as foreground may be replaced by image contents of a corresponding region in a last background image in the list. Further, the image may be added first in the list of background images. This means that foreground pixels of the image to be added to the background model are replaced by background samples from the last background image in the list.

In particular, the image may be added first in the list of background images by rearranging the collection of pointers such that a pointer pointing to a first background image in the list instead points to the image, and each remaining pointer is rearranged to point to a background image in the list which precedes a background image in the list to which the pointer currently points. In this way, the image is thus added first to the list, and the background images in the list are moved one level down in the list by rearranging the pointers. As a result, since the number of background images in the list is kept constant, the last background image in the list is removed from the background model.

Notably, prior to removing the last background image from the list, image contents of the last background image in the list is copied to the new image in the region which is classified as foreground. In this way, background samples which otherwise would have been removed from the background model are reused. This minimizes the number of duplicate background samples in the background model.

In order to classify the pixels of an image as belonging to the foreground or the background, the intensity value of the pixel may generally be compared to the collection of background samples which are associated with the pixel. If the intensity value in a pixel is similar to a predefined number of background samples, the pixel does likely belong to the background. Otherwise it does likely belong to the foreground. More specifically, the step of classifying a region in the image which is foreground comprises, for each pixel in the image: comparing the intensity value of the pixel to each of the background samples associated with the pixel, and determining that the pixel belongs to the region in the image which is foreground if the number of background samples which differ from the intensity value of the pixel by less than a threshold is lower than a predefined number. In this way, the background model may thus efficiently be used to classify the pixels in the image.

The number of background samples which differ from the intensity value of the pixel by less than a threshold may be calculated by counting the number of background samples which differ from the intensity value of the pixel by less than a threshold.

However, in case the predefined number is equal to one, there is a particularly computationally efficient implementation. In such case, a pixel belongs to the foreground if there is no background sample in the collection of background samples which is similar (as defined by differing by less than the threshold) to the intensity value in the pixel. The event "no background sample is similar" is equivalent to the event "not at least one background sample is similar". Suppose that there are N background samples in the collection. Then the event "at least one background sample is similar" may be expressed as the event "(background sample 1 is similar) or (background sample 2 is similar or . . . or (background sample N is similar)". This may be expressed as the union $U_{i=1}^{N}$\{background sample i is similar\}. In conclusion, the event "no background sample is similar" is equivalent to the event "not $U_{i=1}^{N}$\{background sample i is similar\}".

For this reason, the step of determining that the pixel belongs to the region in the image which is foreground may comprise: checking if at least one of the background samples associated with the pixel differ from the intensity value of the pixel by less than a threshold by performing a logical "or"-operation, and if not, determining that the number of background samples which differ from the intensity value of the pixel by less than a threshold is lower than the predefined number, thereby determining that the pixel belongs to the region in the image which is foreground.

Since logical operations typically require less processing power and memory usage than a summation followed by a comparison to a threshold number, this will be computationally efficient.

The threshold (used to determine how similar an intensity value is to a background sample) may vary with the position of the pixel in the image. In particular, it may vary depending on a tendency of the background at the position of the pixel to change values between subsequent images in the image sequence. A higher tendency of changing values may generally give a higher value of the threshold. This is advantageous in that the foreground classification may be adapted to a dynamic background, such as swaying trees, water ripples, etc. For example, the sensitivity of the classification may be increased in non-dynamic regions in comparison to dynamic regions.

The tendency of a background sample at the position of the pixel to change intensity values between subsequent images in the image sequence may be given by an indicator map. This provides for a fast and efficient implementation. In particular, when the image forms part of an image sequence, the threshold may be calculated for each pixel in the image based on an indicator map which, for each pixel in the image, indicate a tendency of background samples at the position of the pixel to change intensity values between subsequent images in the image sequence.

In order to respond to changes in the dynamics of the background, the indicator map is preferably updated in view of the currently received image and a preceding image in the image sequence. The indicator map is typically only updated for pixels which are classified as belonging to the background in the current and the preceding image. In particular, the method may comprise updating the indicator map by: for pixels which neither belong to the region which is classified as foreground in the image nor to a region which is classified as foreground in a preceding image in the image sequence: checking if a difference between the image and the preceding image at a position of the pixel is larger than a predefined amount, and if so, increasing a value in the indicator map for the pixel by a predetermined increment value, and otherwise decreasing the value in the indicator map for the pixel by a predetermined decrement value which is smaller than the predetermined increment value.

Since the increment value is larger than the decrement value, the method is allowed to quickly respond to new dynamics in the background, which for instance may be due to changing wind conditions in the scene. At the same time, the accumulated value in the indicator map will have a slow decrease, which is advantageous since dynamic background movement is likely to happen again.

In order to capture dynamics in the background of different time scales, the method may further use more than one background model. The different background models may be designed to have different time horizons. For example, there may be a first background model having a short time horizon and a second background model having a longer time horizon. In particular, the background model may be a first background model, and the step of classifying a region of the image as foreground may comprise performing background subtraction by using a second background model in addition to the first background model, wherein, in the first background model, the collection of background samples for each pixel are based on images sampled (i.e., received) from a first time interval, and wherein, in the second background model, a collection of background samples for each pixel are based on images sampled from a second time interval, wherein the first time interval is part of the second time interval.

The second background model is thus of the same type as the first background model, with the difference that the second background model has a longer time horizon. The time horizon is here defined by a time interval during which background samples in the background model were collected. By way of example, the first background model may comprise background samples from images sampled during the last two seconds, whereas the second background model may comprise background samples from images sampled during the last 30 seconds.

The method may further comprise updating the second background model. Thus, both the first and the second background model may be updated. Preferably, in order to avoid redundant information in the background models, only one of the background models is updated with respect to each received image in the image sequence. More specifically, the image may form part of an image sequence, and the method may comprise, for each image in the sequence, updating one of the first background model and the second background model, wherein the first background model is updated more frequently than the second background model. By updating the first background model more frequently than the second background model, the different time horizons may be achieved.

By way of example, assume that the first and the second background model each comprises ten background images and that images of the image sequence are received five times per second. The second background model may then be updated every 15th image, and the first background model may be updated with respect to all other received images. In that way, the first background model will have a time horizon of two seconds and the second background model will have a time horizon of 30 seconds.

According to a second aspect of the invention, the above object is achieved by a computer program product comprising a computer-readable medium having computer code instructions stored thereon for carrying out the method of the first aspect when executed by a device having processing capability.

According to a third aspect of the invention, the above object is achieved by an apparatus for updating a background model used for background subtraction of an image, comprising:

a receiver configured to receive an image;

a foreground classifier configured to classify a region of the image as foreground by performing background subtraction using a background model which comprises a collection of background samples for each pixel in the image, wherein the collection of background samples is arranged in a list of background images such that each pixel of the image has a background sample in a each of the background images at a pixel position which corresponds to that in the image, a foreground replacing component configured to replace image contents in the region of the image which is classified as foreground by image contents of a corresponding region in a background image in the list, and a background updating component configured to add the image to the list of background images by rearranging a collection of pointers which each points to one of the background images in the list, such that one of the pointers instead points to the image.

The foreground replacing component may further be configured to replace image contents in the region of the image which is classified as foreground by image contents of a corresponding region in a last background image in the list, and the background updating component may be configured to add the image first in the list of background images.

The background updating component may be configured to add the image first in the list of background images by rearranging the collection of pointers such that a pointer pointing to a first background image in the list instead points to the image, and each remaining pointer is rearranged to point to a background image in the list which precedes a background image in the list to which the pointer currently points.

The second and third aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. The systems and devices disclosed herein will be described during operation.

Figure 1:
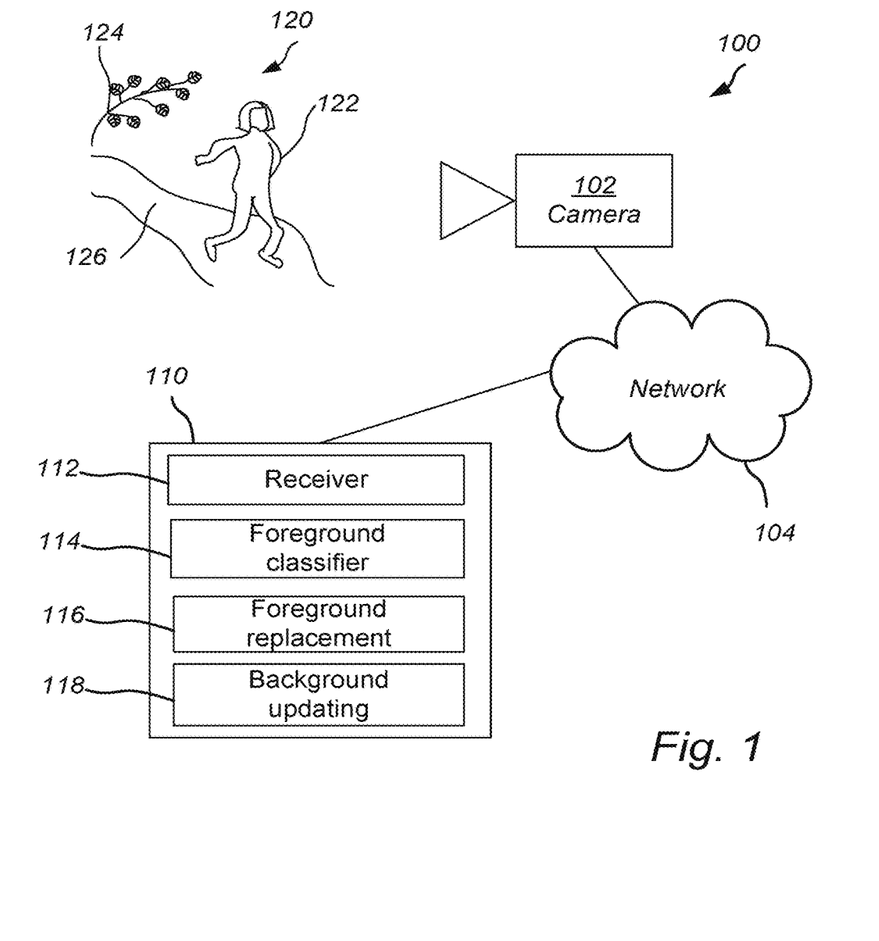
FIG. 1 schematically illustrates a camera system comprising an apparatus for updating a background model used for background subtraction of an image.

FIG. 1 illustrates a camera system 100 comprising a camera 102 and an apparatus 110 for updating a background model used for background subtraction of images captured by the camera 102. The camera 102 is operatively connected to the apparatus 110, e.g. via a wired or wireless network 104.

The camera 102 is arranged to capture a sequence of images of a scene 120, and transmit the captured sequence of images to the apparatus 110. In particular, the camera 102 may be a surveillance camera which for instance may be used to follow moving objects in the scene 120. The scene 120 may comprise different objects. For example, there may be moving objects 122, here illustrated by a running person, which should be tracked in the sequence of images, hence belonging to the foreground. There may also be background objects 124 and 126, here illustrated by a branch of a tree 124 and a trail 126. The background objects may be static, such as the trail 126, or dynamic, such as the branch 124 which may sway back and forth as the wind blows.

The apparatus 110 comprises a receiver 112, a foreground classifier 114, a foreground replacing component 116, and a background updating component 118. The internal components 112, 114, 116, and 118 of the apparatus 110 may be implemented in hardware, software, or a combination thereof. For example, the apparatus 110 may comprise a processor and a non-transitory computer-readable medium (i.e., a memory) which may store software instructions for carrying out any method disclosed herein when executed by the processor.

The operation of the apparatus 110 will now be described with reference to FIGS. 1-4 and the flow chart of FIG. 5.

Figure 2:
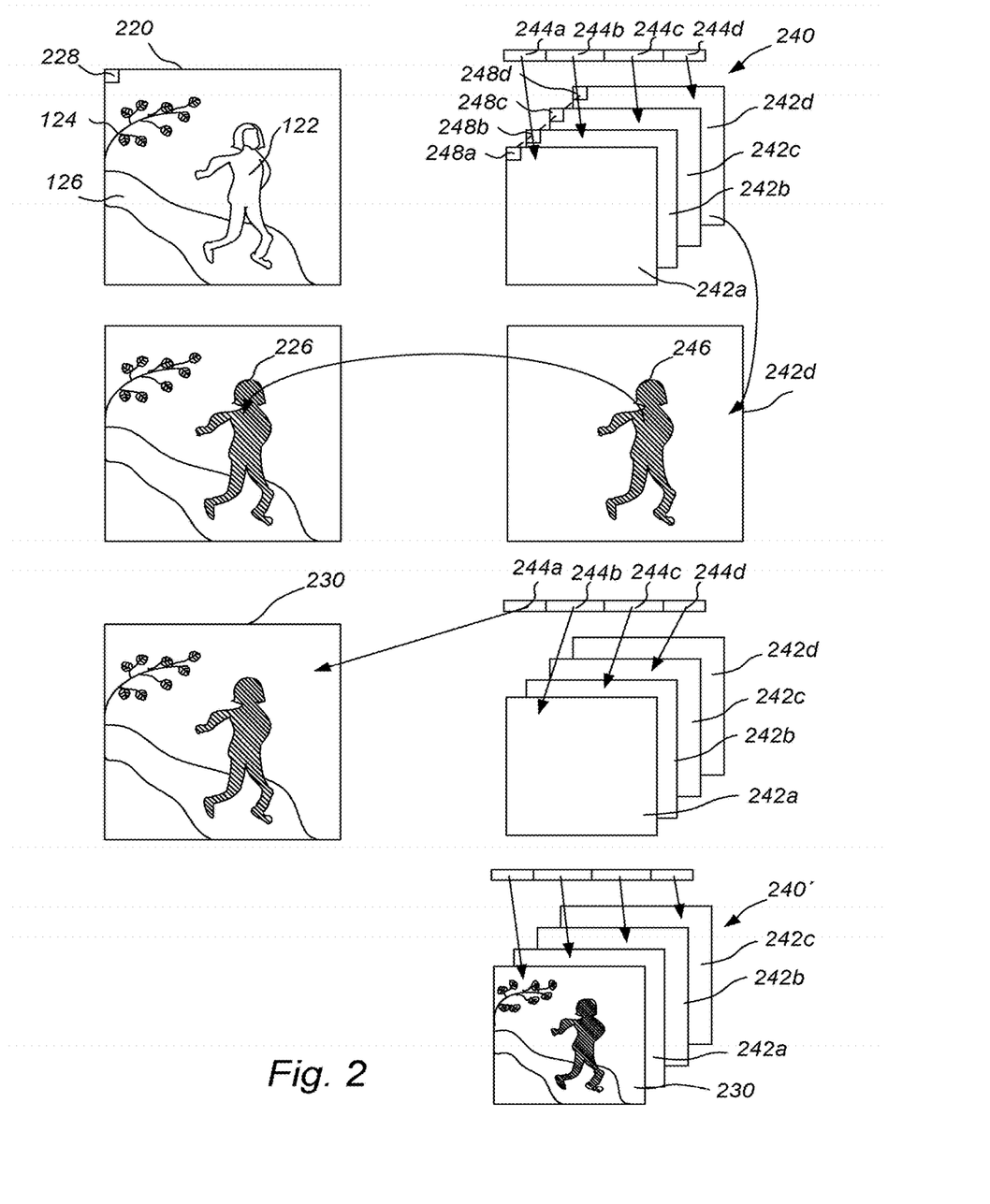
FIG. 2 schematically illustrates a sequence of steps taken for updating a background model used for background subtraction of an image according to a first embodiment.

In step S02 the receiver 112 receives an image 220 depicting the scene 120 from the camera 102, for instance over the network 104. The image 220 is part of a sequence of images sent from the camera 102 to the apparatus 110. In the image 220 there are depicted foreground objects 122 and background objects 124, 126.

In step S04, the foreground classifier 114 classifies each pixel 228 as belonging to the background or the foreground. For this purpose, the foreground classifier 114 makes use of a background model 240. The background model comprises a plurality background images 242a, 242b, 242c, 242d. For the sake of illustration, four background images are shown. However, typically there are about 20 background images. Each background image 242a, 242b, 242c, 242d has the same number of pixels as the image 220 received from the camera 102. More specifically, each pixel in the background images 242a, 242b, 242c, 242d comprises a background sample of a corresponding pixel in the image 220. For example, pixel 248a of background image 242a comprises a background sample associated with pixel 228 of the image 220. Similarly, pixels 248b, 248c, 248c of background images 242b, 242c, 242d, respectively, each comprises a background sample associated with pixel 228 of the image 220. In other words, the background samples of pixels 248a, 248b, 248c, 248c is a collection of background samples for pixel 228 of the image 220.

The background images 242a, 242b, 242c, 242d are arranged as a list, meaning that they are an ordered collection of background images. There is thus a first background image in the list, in this case background image 242a, and a last background image in the list, in this case background image 242d.

The background model further comprises a collection of pointers 244a, 244b, 244c, 244d. The pointers each point to one of the background images 242a, 242b, 242c, 242d in the list. Here pointer 244a, which is the first pointer in the collection, points to the first background image 242a in the list. Similarly, the second pointer 244b in the collection points to the second background image 242b in the list, and so on.

When classifying each pixel 228 in the image 220 as background or foreground, the foreground classifier 114 may apply background subtraction as for example described in Wang and Suter ("A consensus-based method for tracking: Modelling background scenario and foreground appearance". *Pattern Recognition*, 40(3), 2007). In the example of FIG. 2, the foreground classifier 114 will, by applying the background subtraction, classify pixels falling inside the object 122 as belonging to the foreground. In other words, there is a region 226 in the image 220 which is classified as foreground.

In more detail, denote the observation in pixel m at time t of the image sequence by $x_t(m)$, and the collection of background samples of pixel m by $\{x_i(m)|i=1, \ldots, N\}$. Each observation $x_t=(x_t^{C_1}, \ldots, x_t^{C_k})$ has k channels (e.g., in RGB color space each observation is expressed by three channels of R, G, B). The foreground classifier 114 may, for each pixel 228 in the image 220, compare the intensity value (for each channel if applicable) to each background sample 248a, 248b, 248c, 248d associated with the pixel 228, to see if the intensity value differs from each of the background samples by less than a threshold $T_r$. For example, the foreground classifier 114 may associate background samples which differ from the intensity value in the pixel by less than the threshold $T_r$ with the value "one", and the other background samples may be associated with the value "zero" according to:

$$\Gamma_i^c(m) = \begin{cases} 1 & \text{if } |x_i^c(m) - x_t^c(m)| \leq T_r \\ 0 & \text{otherwise} \end{cases} \quad (1)$$

If the number of background samples in the collection 248a, 248b, 248c, 248d which differs from the intensity value of the pixel by less than the threshold $T_r$ is above or equal to a predefined number $T_N$, the foreground classifier 114 may determine that the pixel belongs to the background. Otherwise it belongs to the foreground.

This may be implemented by calculating a binary mask $B_t$ which at time t takes the value "one" for background pixels and "zero" for foreground pixels according to:

$$B_t(m) = \begin{cases} 1 & \text{if } \sum_{i=1}^{N} \Gamma_i^c(m) \geq T_N, \forall c \in \{C_1, \ldots, C_k\} \\ 0 & \text{otherwise} \end{cases} \quad (2)$$

Expressed differently, the foreground classifier 114 may thus count the number of background samples in the collection 248a, 248b, 248c, 248d which differs from the intensity value of the pixel 228 by less than the threshold $T_r$. If the number is equal to or exceeds a predefined number $T_N$, the foreground classifier determines that the pixel belongs to the background, and otherwise to the foreground. Thus, if the foreground classifier finds at least $T_N$ background samples in the collection 248a, 248b, 248c, 248d which are similar (in the sense of equation 1) to the intensity value in the pixel 228, the pixel 228 will be classified as belonging to the background, and otherwise to the foreground.

It has been found that it may be enough if the intensity value in the pixel 228 is similar to one background sample 248a, 248b, 248c, 248d, i.e. $T_N=1$. In such cases, equation 2 may be implemented in an efficient manner by using logical "or" operations. In particular, equation 2 may be rewritten as:

$$B_t(m) = \begin{cases} 1 & \text{if } \bigcup_{i=1}^{N} \{|x_i^c(m) - x_t^c(m)| \leq T_r\} \\ 0 & \text{otherwise} \end{cases} \quad (3)$$

Thus, the foreground classifier 114 may check if at least one of the background samples associated with the pixel differ from the intensity value of the pixel by less than a threshold by performing a logical "or"-operation (i.e. background sample 248a, or background sample 248b, or background sample 248c, or background sample 248d) should differ from the intensity value of pixel 228 by less than the threshold $T_r$. If this is not the case, the foreground classifier 114 will classify the pixel as belonging to the foreground. In this way, computational complexity may be saved since logical operations require less processing power and less memory usage.

The threshold $T_r$ may be the same for all pixels in the image 220. However, in some embodiments, the threshold $T_r$ may vary with the position of the pixel in the image. Thus, different pixels may have different values of the threshold $T_r$. Further, the threshold $T_r$ may vary with time. Generally, the foreground classifier 114 may set the threshold $T_r$ depending on how often background samples at the position of the pixel tend to change values between consecutive images in the image sequence. In particular, the threshold $T_r$ may be set to be larger for pixels where the background has a tendency to change values often, in comparison to pixels where the background is more or less the same all the time. In this way, the classification can be set to be less sensitive in regions where the background often changes values, i.e., transitions from one modality to another due to, e.g., swaying branches in the scene.

Figure 6:
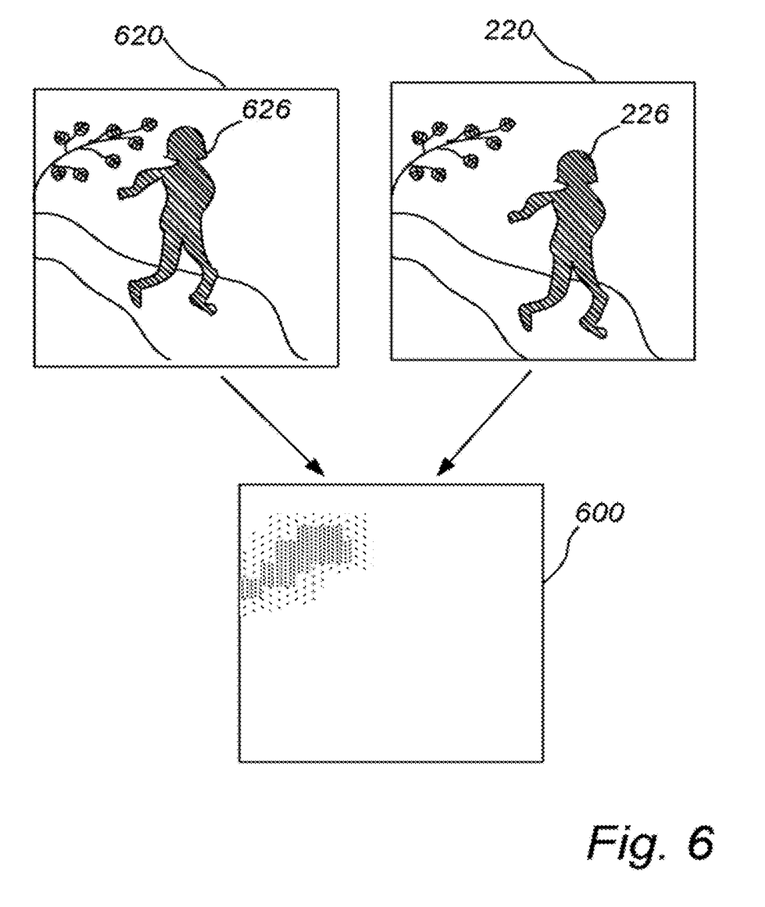
FIG. 6 schematically illustrates a current and a preceding image which are used to update an indicator map in accordance with embodiments.

This is further exemplified in FIG. 6. In order to set the threshold $T_r$, the foreground classifier 114 may keep a two-dimensional map 600 of accumulated modality transition levels of the pixels. This map is referred to as an indicator map. The values of the indicator map thus indicate the tendency of the background to change intensity values between subsequent images in the image sequence. The indicator map thus gives an indication or a measure of the dynamics of the background. Depending on the values in the indicator map, the foreground classifier 114 may then set the threshold $T_r$ for each pixel according to a predefined relation between values of the indicator map and threshold values. This relation typically gives a larger value of the threshold $T_r$ for a larger value of the indicator map in comparison to a lower value in the indicator map. By way of example, the threshold $T_r$ may be selected according to $T_r=T_c+av(m)$, where $T_c$ is a constant and a is a factor which adjusts how much $T_r$ is influenced by the dynamics of the background as given by the indicator map.

The foreground classifier 114 may further update the indicator map 600 in order to adjust to new conditions in the scene, e.g., to changing wind conditions. In particular, the foreground classifier 114 may update the indicator map 600 based on the current image 220 and a preceding image 620 in the image sequence. For this purpose, the foreground classifier 114 may check if a difference between the current image $x_t$, 220, and the preceding image $x_{t-1}$, 620, is larger than a predefined amount $T_m$, and if so, increase the value in the indicator map 600 for such pixels by an increment value, and otherwise decreasing the value in the indicator map 600 by a decrement value. Denoting the value of the indicator map in pixel m by v(m), the foreground classifier may thus update the indicator map 600 as:

$$v(m) = \begin{cases} v(m) + v_{incr} & \text{if } |x_t(m) - x_{t-1}(m)| > T_m \\ v(m) - v_{decr} & \text{otherwise} \end{cases} \quad (4)$$

Typically $v_{incr}$ is larger than $v_{decr}$ in order to quickly respond to new dynamic changes in the background and to decrease slowly since if background movement just happened, it is probable to happen soon again.

The indicator map 600 is only updated for background pixels. In particular, the indicator map is only updated for pixels which are classified as belonging to the background in the current image $x_t$, 220, and the preceding image $x_{t-1}$, 620 (i.e. pixels which falls outside of the foreground region 226 in the current image 220, and the foreground region 626 of the preceding image 620). Further, the foreground classifier 114 may apply a safety margin in order to be sure that only background pixels are used in the update of the indicator map. In more detail, the foreground classifier 114 may neglect background pixels which are spatially close to regions 226, 626, which have been classified as foreground. This may for instance be implemented by applying morphological operations on the classification result. For example, a morphological "dilate" operation on the foreground regions 226, 626 will cause them to grow spatially, thereby adding a safety margin which compensates for potential classification errors.

Next, in step S06, the foreground replacement component 116 replaces image contents, i.e. the intensity values, in the region 226 of the image 220 which is classified as foreground by image contents of a corresponding region 246 in a background image in the list. The region 246 corresponds to the region 226 in that the pixels of the region 226 correspond to the pixels of region 246, i.e. the pixels have the same positions in the images. In the example of FIG. 2, the background image 242d which is last in the list is selected for this purpose. However, any one of the background images 242a, 242b, 242c, and 242d in the background model 240 could have been selected. For example, a background image could have been selected at random from the list. This is the case in the examples of FIGS. 3 and 4, where the second background image 242b was selected following a random selection procedure.

By replacing the image contents in the region 226 of foreground pixels with image contents from the region 246 in a background image, the resulting image 230 only comprises background samples, although the background samples do not originate from the same original image. In this way, only background samples are used to update the background model 240. The foreground replacement component 116 may apply a safety margin in order to be sure that only background pixels are used in the update of the background model. In more detail, the foreground replacement component 116 may also replace image contents in pixels of the image 220 which are spatially close to the region 226 which has been classified as foreground. This may for instance be implemented by applying morphological operations on the classification result prior to replacing image contents. For example, a morphological "dilate" operation on the foreground region 226 will cause it to grow spatially, thereby adding a safety margin which compensates for potential classification errors.

The apparatus 110 then proceeds to step S08 in which the background updating component 118 updates the background model 240. More specifically, the background updating component 118 adds the image 230 to the list of background images. This may be done in a very efficient manner, due to the construction of the background model 240 where the collection of pointers points to the background images. Adding the image 230 to the list is just a matter of rearranging the collection of pointers, such that one of the pointers which previously pointed to one of the background images 242a, 242b, 242c, 242d instead points to the image 230. Notably, the background samples do not need to be moved in the memory of the apparatus 110, and the background samples of the image 230 may be added to the background model 240 in one operation (no pixelwise updating is needed).

The rearrangement of the pointers may be done in different ways. In the example of FIG. 2, the image 230 is added first to the list of background images. In particular, pointer 244a is rearranged to point to image 230, pointer 244b is rearranged to point to the background image 242a, pointer 244c is rearranged to point to the background image 242b, and pointer 244d is rearranged to point to the background image 242c. As a result, the last background image in the list 242d (which notably is the background image that was used to replace image contents in the image 220) will be removed from the background model. The resulting updated background model 240' is illustrated at the bottom of FIG. 2.

Figure 3:
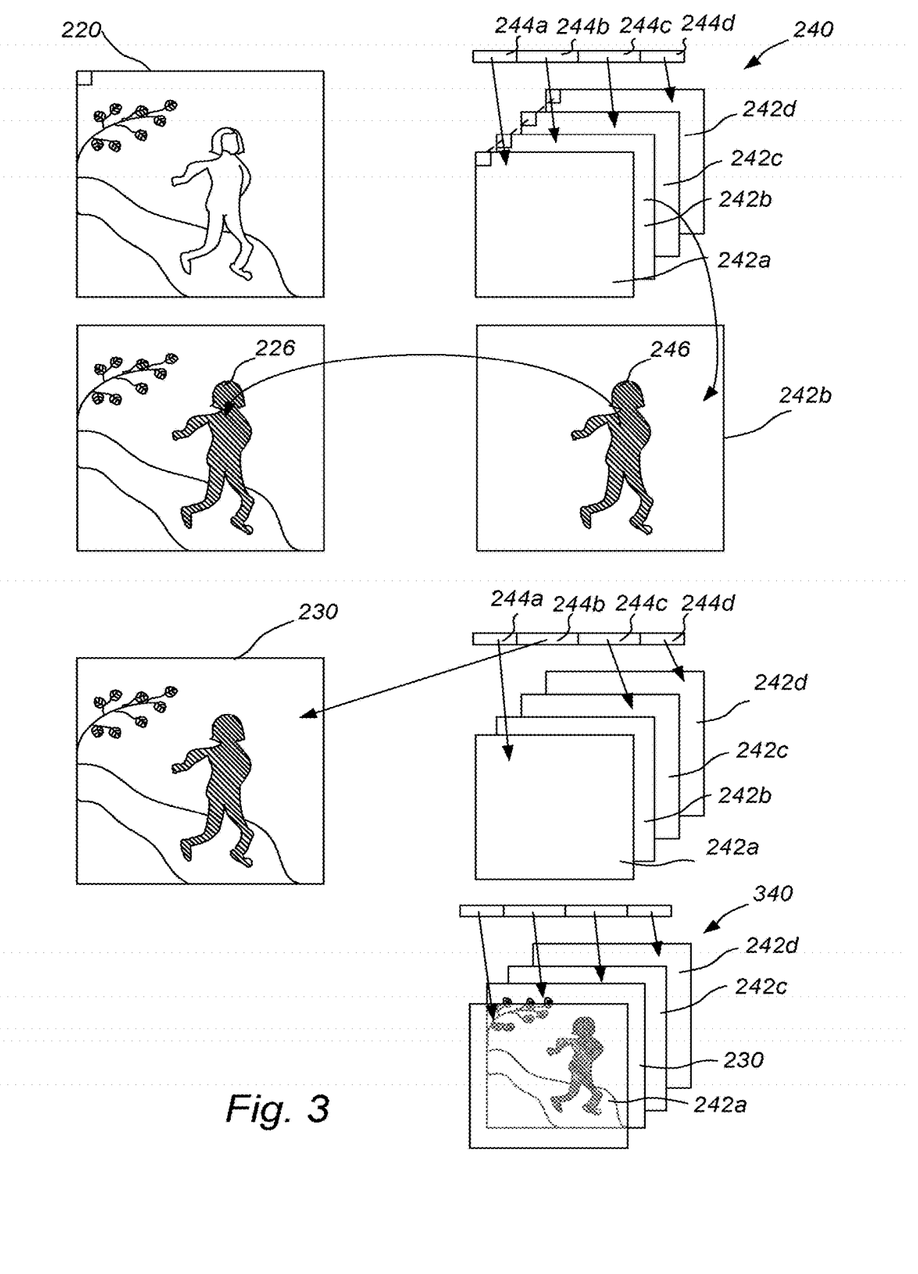
FIG. 3 schematically illustrates a sequence of steps taken for updating a background model used for background subtraction of an image according to a second embodiment.

A slightly different approach is taken in the example of FIG. 3. Instead of adding the image 230 first to the list of background images, it replaces the background image which was used to replace image contents in the foreground region 226 of the image 220. In this example, the second background image 242b in the background model was used to replace image contents in the region 226. Therefore, the background updating component 118 will rearrange the collection of pointers 244a, 244b, 244c, 244d, such that the pointer 244b which pointed to the second background image 244b instead points to the image 230. As a result, the second background image 244b (which is the background image that was used to replace image contents in the image 220) is removed from the background model. The resulting background model 340 is shown at the bottom of FIG. 3

Figure 4:
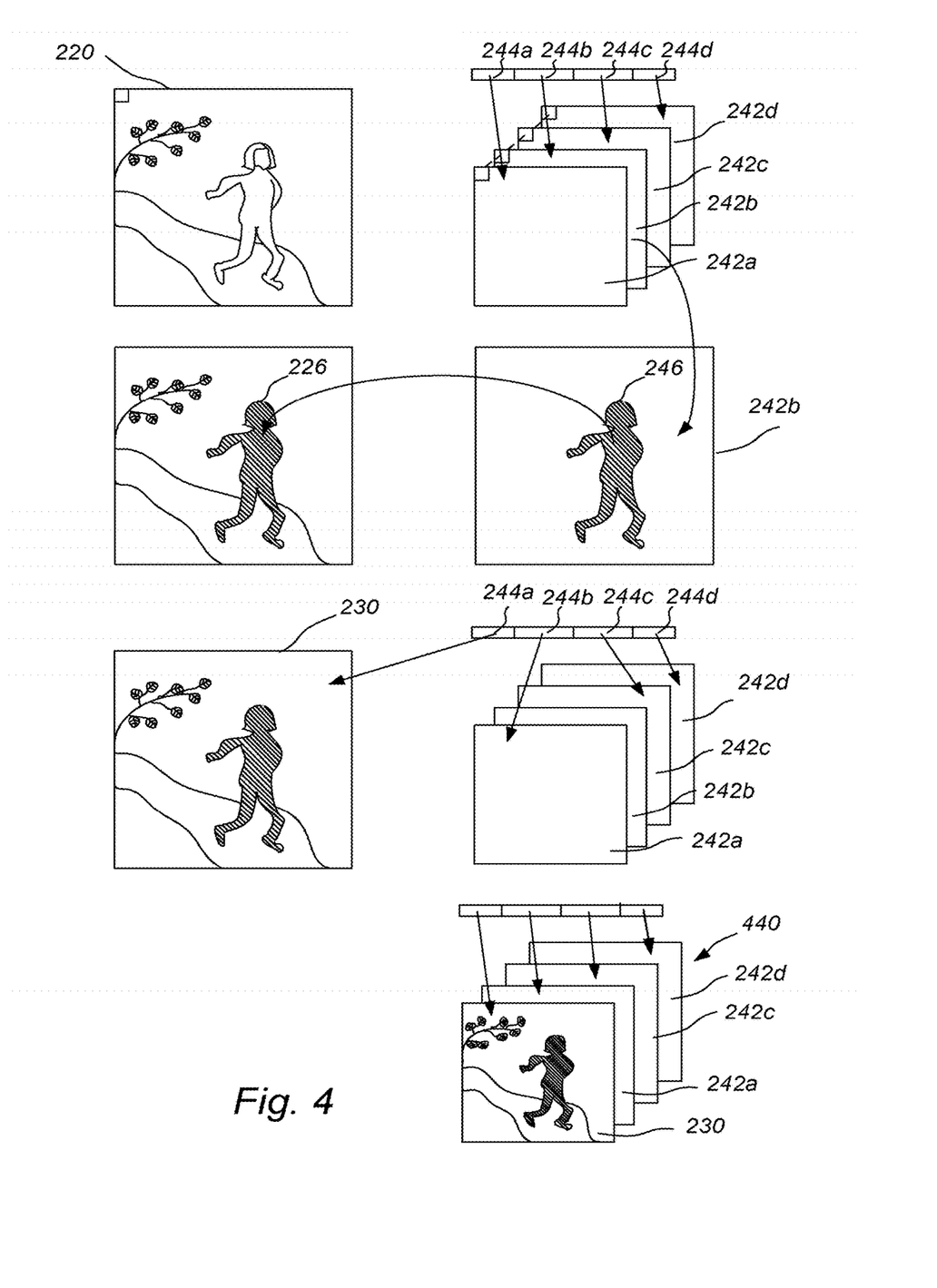
FIG. 4 schematically illustrates a sequence of steps taken for updating a background model used for background subtraction of an image according to a third embodiment.
Figure 5:
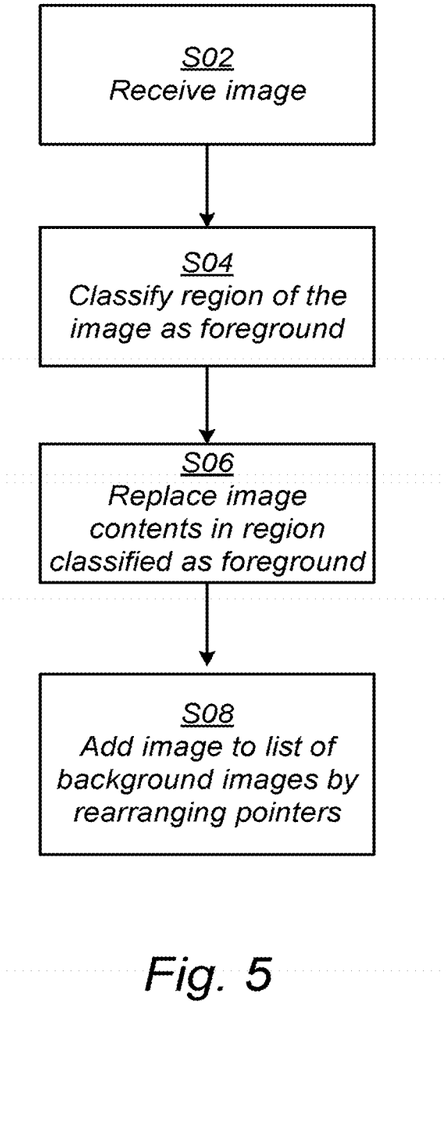
FIG. 5 is a flowchart of a method for updating a background model used for background subtraction of an image according to embodiments.

Yet another approach is taken in the example of FIG. 4. The image 230 is added first to the list of background images, and the randomly selected background image 242b, which was used to replace image contents in the foreground region 226 of the image 220, is removed from the list of background images. Therefore, the background updating component 118 will rearrange the collection of pointers 244a, 244b, 244c, 244d, such that the first pointer 244a points to the image 230 and the second pointer 244b is rearranged to point to the first background image 242a. Generally, all pointers preceding and including the pointer which points to the randomly selected background image which is to be removed are shifted to point to the previous background image in the list. This is with the exception of the first pointer in the list which will point to the new image. As a result, the second background image 244b (which is the background image that was used to replace image contents in the image 220) is removed from the background model. The resulting background model 440 is shown at the bottom of FIG. 3

According to embodiments, the foreground classifier component 114 may further operate with several background models having different time horizons. In this way, both long term variations and short term variations may be dealt with. For example, there may be a first background model of the type described above (having a collection of background samples for each pixel), and a second background model of the type described above. The background samples of the first background model may be collected from images in the image sequence corresponding to a first time interval, such as the last two seconds. The background samples of the second background model may be collected from images in the image sequence corresponding to a second time interval, such as the last 30 seconds.

When the foreground classifier component 114 operates with several background models, it will compare the intensity value of a pixel to the background samples in each of the background models, e.g., in the manner discussed above in connection to equation (1). It will then determine that the pixel belongs to the region in the image which is foreground if the number of background samples (in all background models when looked at together) which differ from the intensity value of the pixel by less than a threshold is lower than a predefined number. In other words, the sum in equation (2) or the union in equation (3) is over the background samples in all background models.

All background models may be updated in accordance to what has been described above. In particular, as a sequence of images is received, the apparatus 110 may interchangeably update the different background models. In other words, the apparatus 110 may update (at most) one of the background models per received image. In order to allow the background models to have different time horizons, the different background models may be updated with different frequencies—the longer the time horizon, the lower the updating frequency. In the above example, with two background models, the time horizon of the second background model is 15 times as long as the time horizon of the first background model. The updating frequency of the second background model should therefore be a factor of 15 lower than the updating frequency of the first background model. In a specific example, the first background model and the second background model may each have ten background images. Images of the image sequence may be received five times each second. The second background model may be updated every 15:th image. The first background model may be updated with respect to all other images.

It will be appreciated that a person skilled in the art can modify the above-described embodiments in many ways and still use the advantages of the invention as shown in the embodiments above.

Thus, the invention should not be limited to the shown embodiments but should only be defined by the appended claims. Additionally, as the skilled person understands, the shown embodiments may be combined.

The invention claimed is:

1. A method, performed in an apparatus, for updating a background model used for background subtraction of an image, comprising:
   receiving an image forming part of an image sequence,
   classifying a region of the image as foreground by performing background subtraction using a background model which comprises a collection of background samples for each pixel in the image, wherein the collection of background samples is arranged in a list of background images such that each pixel of the image has a background sample in each of the background images at a pixel position which corresponds to that in the image, and wherein the background images comprise background samples of images preceding the received image in the image sequence,
   replacing image contents in the region of the image which is classified as foreground by image contents of a corresponding region in a background image in the list, and
   adding the image to the list of background images by rearranging a collection of pointers which each points to one of the background images in the list, such that one of the pointers instead points to the image.

2. The method of claim 1, wherein image contents in the region of the image which is classified as foreground is replaced by image contents of a corresponding region in a last background image in the list, and wherein the image is added first in the list of background images.

3. The method of claim 2, wherein the image is added first in the list of background images by rearranging the collection of pointers such that a pointer pointing to a first background image in the list instead points to the image, and each remaining pointer is rearranged to point to a background image in the list which precedes a background image in the list to which the pointer currently points.

4. The method of claim 1, wherein the step of classifying a region in the image which is foreground comprises, for each pixel in the image:
   comparing the intensity value of the pixel to each of the background samples associated with the pixel, and
   determining that the pixel belongs to the region in the image which is foreground if the number of background samples which differ from the intensity value of the pixel by less than a threshold is lower than a predefined number.

5. The method of claim 4, wherein the number of background samples which differ from the intensity value of the pixel by less than a threshold is calculated by counting the number of background samples which differ from the intensity value of the pixel by less than a threshold.

6. The method of claim 4, wherein the predefined number is equal to one, and wherein the step of determining that the pixel belongs to the region in the image which is foreground comprises:
   checking if at least one of the background samples associated with the pixel differ from the intensity value of the pixel by less than a threshold by performing a logical "or"-operation, and if not, determining that the number of background samples which differ from the intensity value of the pixel by less than a threshold is lower than the predefined number, thereby determining that the pixel belongs to the region in the image which is foreground.

7. The method of claim 4, wherein the threshold varies with the position of the pixel in the image.

8. The method of claim 7, wherein the threshold is calculated for each pixel in the image based on an indicator map which, for each pixel in the image, indicate a tendency of background samples at the position of the pixel to change intensity values between subsequent images in the image sequence.

9. The method of claim 8, further comprising updating the indicator map by:
   for pixels which neither belong to the region which is classified as foreground in the image nor to a region which is classified as foreground in a preceding image in the image sequence:
   checking if a difference between the image and the preceding image at a position of the pixel is larger than a predefined amount, and if so, increasing a value in the indicator map for the pixel by a predetermined increment value, and otherwise decreasing the value in the indicator map for the pixel by a predetermined decrement value which is smaller than the predetermined increment value.

10. The method of claim 1, wherein the background model is a first background model, and the step of classifying a region of the image as foreground comprises performing background subtraction by using a second background model in addition to the first background model,
    wherein, in the first background model, the collection of background samples for each pixel are based on images sampled from a first time interval, and wherein, in the second background model, a collection of background samples for each pixel are based on images sampled from a second time interval, wherein the first time interval is part of the second time interval.

11. The method of claim 10, further comprising, for each image in the image sequence, updating one of the first background model and the second background model, wherein the first background model is updated more frequently than the second background model.

12. A non-transitory computer-readable medium having computer code instructions stored thereon for carrying out the method of claim 1 when executed by a device having processing capability.

13. An apparatus for updating a background model used for background subtraction of an image, comprising:
   a receiver configured to receive an image forming part of an image sequence;
   a foreground classifier configured to classify a region of the image as foreground by performing background subtraction using a background model which comprises a collection of background samples for each pixel in the image, wherein the collection of background samples is arranged in a list of background images such that each pixel of the image has a background sample in each of the background images at a pixel position which corresponds to that in the image, wherein the background images comprise background samples of images preceding the image in the image sequence,
   a foreground replacing component configured to replace image contents in the region of the image which is classified as foreground by image contents of a corresponding region in a background image in the list, and
   a background updating component configured to add the image to the list of background images by rearranging a collection of pointers which each points to one of the background images in the list, such that one of the pointers instead points to the image.

14. The apparatus of claim 13, wherein the foreground replacing component is further configured to replace image contents in the region of the image which is classified as foreground by image contents of a corresponding region in a last background image in the list, and the background updating component is configured to add the image first in the list of background images.

15. The apparatus of claim 14, wherein the background updating component is configured to add the image first in the list of background images by rearranging the collection of pointers such that a pointer pointing to a first background image in the list instead points to the image, and each remaining pointer is rearranged to point to a background image in the list which precedes a background image in the list to which the pointer currently points.

* * * * *